Figure 2:
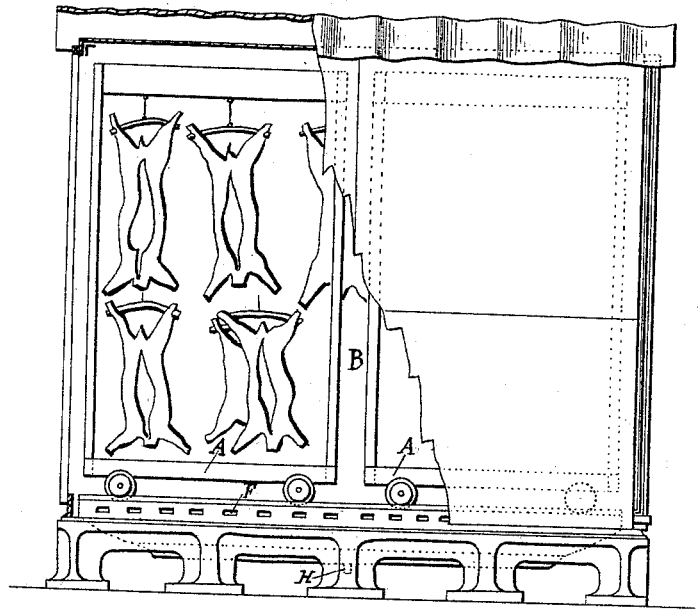

(No Model.) 2 Sheets—Sheet 1.
C. L. BACHELERIE.
PROCESS OF AND APPARATUS FOR PRESERVING FOOD.
No. 440,528. Patented Nov. 11, 1890.
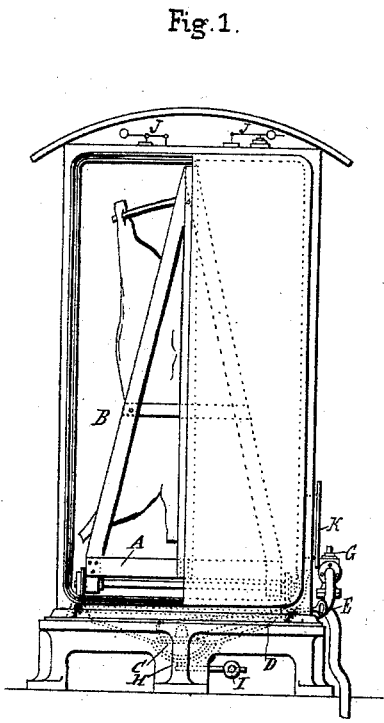
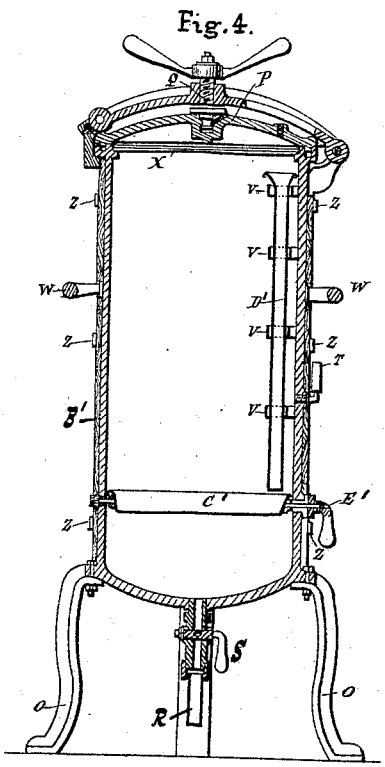
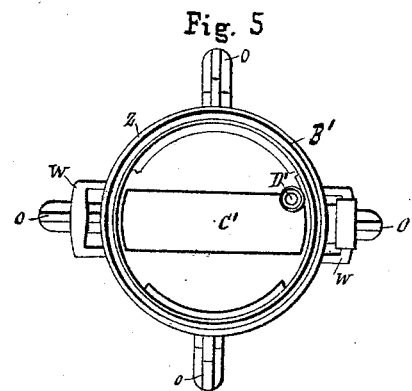
WITNESSES
INVENTOR
Charles Léon Bachelerie (No Model.)

2 Sheets—Sheet 2.

C. L. BACHELERIE.
PROCESS OF AND APPARATUS FOR PRESERVING FOOD.

No. 440,528.　　　　　　　　Patented Nov. 11, 1890.

WITNESSES

INVENTOR

UNITED STATES PATENT OFFICE.

CHARLES LÉON BACHELERIE, OF PARIS, FRANCE.

PROCESS OF AND APPARATUS FOR PRESERVING FOOD.

SPECIFICATION forming part of Letters Patent No. 440,528, dated November 11, 1890.

Application filed September 11, 1890. Serial No. 364,649. (No model.)

*To all whom it may concern:*

Be it known that I, CHARLES LÉON BACHELERIE, a citizen of France, and a resident of Paris, France, have invented certain Improvements in a New Process of and Apparatus for Preserving Organic Substances, and especially alimentary substances, of which the following is a specification.

This invention relates to a new process of preserving alimentary substances, as, also, to the construction and use of apparatus adapted for application in such process. Many attempts have been hitherto made to preserve alimentary substances—such as meat, fish, eggs, vegetables, &c.—more especially in view of conveying them long distances. Most of these attempts have failed, the freezing process alone having succeeded; but it is well known that that method is expensive, that it requires complicated fittings, and that the matter submitted to such freezing process loses much of its primitive savor and soon spoils when brought back to the temperature of the surrounding atmosphere. My new process presents none of these drawbacks. It secures perfect preservation of organic substances for a considerable length of time and enables them to be conveyed to any distance in free air, provided such air be constantly renewed. It is very economical, for the substances I use are cheap and the treatment only lasts a few minutes. Finally, the alimentary products not only retain their nutritive qualities, but also their savor entirely unchanged.

The process consists, essentially, in treating (under pressure) meat, fish, eggs, vegetables, &c., by a homogeneous mixture of hydrochloric acid and carbonic acid, with this particularity, that the carbonic acid is only used as a medium for the hydrochloric acid, which it brings to a finely-divided state and which it causes to penetrate the matter to be preserved.

In order to apply my invention, I use, by preference, bicarbonate of soda, and I treat it with a concentrated solution of hydrochloric acid in larger quantity than would be necessary to set at liberty carbonic acid. This operation is effected in presence of the matters to be preserved in a closed vessel capable of resisting strong pressure. The reaction is very sharp. The carbonic acid as fast as it is set at liberty converts the hydrochloric acid, which is in a free state, into a sort of spray and mixes thoroughly with it, upon which, by the action of the increasing pressure which results, both penetrate into the mass of the substances to be preserved, such substances being thus thoroughly impregnated. By means of this penetration the quantity of the preserving agent disseminated through the mass is very slight, since the chemical analysis of the substances preserved shows only slight traces of hydrochloric acid. This quantity cannot, therefore, be in any way injurious to health. It is, nevertheless, sufficient to secure the preservation for a long time of the matters treated.

I have stated above that the quantity of hydrochloric acid used should be a little in excess of what is required to set at liberty all the carbonic acid of the bicarbonate of soda. This condition is not absolutely essential, and the result might be attained by mixing the two elements in the proportions given by the formula for reaction—viz., one part by weight of hydrochloric acid for two parts of bicarbonate of soda. In fact, the action is so rapid and the production of gas so abundant that the hydrochloric acid is carried off as soon as the reaction begins, so that such reaction may perhaps not entirely be completed—that is to say, there may remain a certain portion of bicarbonate unaffected. It is therefore impossible to adopt strictly fixed proportions, but satisfactory results will be obtained with the relative quantities above specified. With these relative quantities the total quantity of reacting agents will vary, according to the capacity of the cylinder and the pressure required to be obtained. As a rule, a pressure of an atmosphere and one-half suffices, but it may reach two or even three atmospheres when it is necessary to penetrate bulky pieces. The apparatus should be made to resist that amount of pressure. The meats thus prepared are afterward exposed to free air, which must often be renewed. The evaporation of all the aqueous parts contained in them then begins. According as they contain more or less water, or as they are preserved with a more or less thick outer covering, they remain for a longer or shorter period in the moist condition desirable for edibles. For instance, pigeons may be eaten after a lapse of forty-five days, beef after six weeks, eggs after eight or ten months. After that time these matters get drier every day, until at last they lose their natural moisture entirely.

In order to put my process in practice I have contrived an apparatus which is illustrated in the accompanying drawings, in which—

Figure 3:
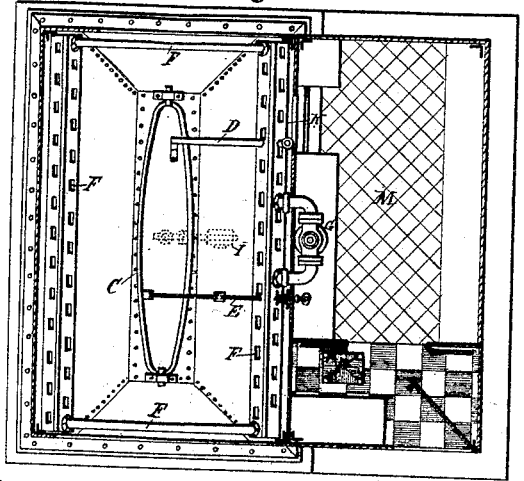

Figure 1 is a cross view, half in section, Fig. 2 a longitudinal view, half in section, and Fig. 3 a horizontal section, of one form of apparatus provided with the necessary parts. Fig. 4 is a vertical sectional view showing a modification of the apparatus, and Fig. 5 is a plan view of the same.

In all these figures the same letters of reference indicate corresponding parts.

In the metallic chamber B, constructed to resist a high pressure, supports A, running on rails, are placed, (two are shown in the example given,) of suitable form, which carry the matters to be treated. These supports or carriages enter by a door capable of being made air-tight at one end of the apparatus, remain in the chamber while the reaction takes place, and leave by an opposite door, similar to the first. On the floor of the chamber B, arranged in the form of a reversed pyramidal trunk, the required quantity of bicarbonate of soda is placed. Above is placed a movable bowl C, intended to receive by a tube D the hydrochloric acid. This bowl may be made to swing on pivots at each side. This swinging motion is effected from outside by means of a rod E with a handle. Around the chamber are placed pipes F, perforated with holes, by which water is forced, when desirable, by means of a distributing-tap G. A discharge-opening H at the bottom of the chamber is closed by a plug with balance-weight I. Finally, on the top of the chamber one or more safety-valves J are fitted, as also an electric bell or other similar contrivance to show the limit of pressure, which must not be exceeded, and which marks the end of the operation.

Fig. 3 represents at the side of the apparatus, strictly speaking, a chamber M, in which the operator may sit, and communicating by a small window K with the apparatus.

The process will now be easily understood. The bicarbonate of soda being spread over the bottom of chamber B and the carriages A being in position, all the issues are closed. The desired quantity of hydrochloric acid is passed into the bowl C by the pipe D, upon which by pulling the rod E the bowl is upset. The acid falls all at once upon the bicarbonate of soda. Carbonic acid is set at liberty in abundance and mingles with the hydrochloric acid in excess, so as to bring it to a very finely-divided state. The pressure increases rapidly in the chamber and in a few minutes the pressure-indicator announces that the operation is terminated. The discharge-valve H and the water-tap G are then opened. The water gushes out of the holes in the pipes F, washes the floor of the chamber, and carries away the products of the reaction. The doors of the apparatus may then be opened, the carriages A drawn out, and the operation recommenced.

I have also contrived a portable apparatus essentially similar to the first, but on a smaller scale, and suitable even for households. It is composed of a cylinder B', of enameled cast-iron or lined with any other acid-proof matter, and mounted on four legs O. This cylinder is closed at the top by an autoclave lid P, held firmly down by a pressure-screw Q. It is provided with a discharge-pipe R, having a tap S, a manometer or pressure-gage T, and upon the lid may be a safety-valve (not shown) and an opening for the introduction of the acid, which opening may be closed by a screw-plug. The bowl C' for hydrochloric acid swings upon its two pivots, one of which extends outside and is fitted with a handle E'. This bowl is of course acid-proof. A tube D' of glass, porcelain, or other suitable material, supported by holdfasts V, conveys the acid to the bowl. The matter to be preserved is suspended from one or more cross-bars X. It may also, according to its nature, be arranged on perforated shelves or gratings placed one above the other or in any other suitable manner. The cylinder B' is preferably covered outside with wood, bound together with hoops Z. Two handles W may also be fitted to it in order to facilitate carriage.

In order to make use of this apparatus, the desired quantity of bicarbonate of soda is placed on the bottom of the cylinder B', after which the substances to be treated are introduced. The lid is then fixed down firmly by means of the screw Q, and by the proper opening the acid is introduced and descends by the pipe D' into the bowl C'. The opening is then closed by its screw-plug, and by turning the handle E' the bowl is upset. The hydrochloric acid falls all at once upon the salt of soda, setting at liberty an abundance of carbonic acid mixed with hydrochloric acid in the form of spray, and having the effects above described. It is evident that the above-described apparatus may be varied and modified in a variety of ways, both in construction and in form, without in any way affecting the principle of my invention.

What I claim as my invention, and desire to secure by Letters Patent, is—

1. The new or improved process of preservation of alimentary substances, which consists, essentially, of treating them in a closed vessel and under pressure with a mixture of gaseous or very finely-divided hydrochloric acid and carbonic acid, the latter acting more especially as a medium for the hydrochloric acid, in the manner and for the purpose above specified.

2. In an apparatus for preserving alimentary substances, the combination of the metallic recipient, the oscillatory acid-bowl, a tube for conveying the acid to the bowl, and the perforated tubes for washing after each operation, substantially as described.

In testimony whereof I have signed my name to this specification in the presence of two subscribing witnesses.

CHARLES LÉON BACHELERIE.

Witnesses:
G. LOMBARD JOURVILE,
CH. BROWN.